United States Patent
Arnold (10) Patent No.: US 9,719,349 B1
(45) Date of Patent: Aug. 1, 2017

(54) SUPPORT SYSTEM, EXCAVATION ARRANGEMENT, AND PROCESS OF SUPPORTING AN OBJECT

(71) Applicant: Sandia Corporation, Albuquerque, NM (US)

(72) Inventor: Bill W. Arnold, Portland, OR (US)

(73) Assignee: Sandia Corporation, Albuquerque, NM (US)

(*) Notice: Subject to any disclaimer, the term of this patent is extended or adjusted under 35 U.S.C. 154(b) by 227 days.

(21) Appl. No.: 14/032,341

(22) Filed: Sep. 20, 2013

Related U.S. Application Data (60) Provisional application No. 61/706,548, filed on Sep. 27, 2012.

(51) Int. Cl.
*E02D 5/80* (2006.01)
*E21F 17/00* (2006.01)

(52) U.S. Cl.
CPC ................................. *E21F 17/00* (2013.01)

(58) Field of Classification Search
USPC .............. 248/222.13, 229.11, 229.21, 230.2, 248/231.31, 231.21; 52/155, 160, 161; 411/53
See application file for complete search history.

(56) References Cited

U.S. PATENT DOCUMENTS

| | | | | |
|---|---|---|---|---|
| 3,924,371 | A * | 12/1975 | Kidwell | ........................... 52/161 |
| 4,015,433 | A * | 4/1977 | Shibata | ...................... 405/259.5 |
| 4,184,657 | A | 1/1980 | Jardine | |
| 4,189,879 | A * | 2/1980 | Patterson | ........................ 52/161 |
| 4,323,129 | A * | 4/1982 | Cordes | .................... E21B 10/32 |
| | | | | 175/173 |
| 4,644,712 | A * | 2/1987 | Watson | ............................ 52/162 |
| 4,843,785 | A * | 7/1989 | Sero et al. | ...................... 52/160 |
| 4,899,501 | A * | 2/1990 | Yates | ............................... 52/160 |
| 5,108,068 | A * | 4/1992 | Gingras | ......................... 248/545 |
| 6,793,444 | B2 * | 9/2004 | Kondo et al. | ............... 405/259.3 |
| 7,621,098 | B2 * | 11/2009 | Reinert, Sr. | ................... 52/742.1 |
| 2010/0263478 | A1 | 10/2010 | Reed | |

OTHER PUBLICATIONS

PBP Bridge Plug, Packer System, Weatherford International Ltd., Houston, Texas, 2008, www.weatherforddirect.com/groups/public/documents/weatherforddirect/wft direct pbg.pdf.
Cast Iron Bridge Plugs, TechTool International, Jan. 13, 1998, Barker, Texas, www.tectool.co/tti/catalogs/ret&plug%20catalog.pdf.
Spring-Loaded Camming Device, en.wikipedia.org/wiki/spring-loaded camming device, last modified Aug. 3, 2012.

* cited by examiner

*Primary Examiner* — Steven Marsh
(74) *Attorney, Agent, or Firm* — Daniel J. Jenkins (57) ABSTRACT

A support system, an excavation arrangement, and a process of supporting an object are disclosed. The support system includes a weight-bearing device and a camming mechanism positioned below the weight-bearing device. A downward force on the weight-bearing device at least partially secures the camming mechanism to opposing surfaces. The excavation arrangement includes a borehole, a support system positioned within and secured to the borehole, and an object positioned on and supported by the support system. The process includes positioning and securing the support system and positioning the object on the weight-bearing device.

19 Claims, 6 Drawing Sheets

SUPPORT SYSTEM, EXCAVATION ARRANGEMENT, AND PROCESS OF SUPPORTING AN OBJECT

CROSS-REFERENCE TO RELATED APPLICATIONS

This application claims the benefit of U.S. Provisional Patent Application 61/706,548, entitled SUPPORT SYSTEM, EXCAVATION ARRANGEMENT, AND PROCESS OF SUPPORTING AN OBJECT, filed Sep. 27, 2012, which is incorporated herein by reference in its entirety.

STATEMENT CONCERNING FEDERALLY SPONSORED RESEARCH

This invention was developed under Contract DE-AC04-94AL85000 between Sandia Corporation and the United States Department of Energy.

FIELD OF THE INVENTION

The present invention is directed to support systems, excavation arrangements, and processes of supporting objects. More specifically, the present invention is directed to support systems having a weight-bearing device and a camming mechanism positioned below the weight-bearing device.

BACKGROUND OF THE INVENTION

In general, known systems for storage of radioactive waste have been undesirable with regard to safety and engineering assurance, simplicity, cost and efficiency, political and social support, and combinations thereof. Prior systems have been expensive, time-consuming to use, and face serious political and social challenges. Mined geological repositories have especially shown inflexibility and other challenges.

Nevertheless, numerous factors suggest that deep borehole storage of radioactive waste is inherently safe. Several lines of evidence indicate that groundwater at depths of several kilometers in continental crystalline basement rocks has long residence times and low velocity. High salinity fluids have limited potential for vertical flow because of density stratification, which also prevents colloidal transport of radionuclides. Geochemically reducing conditions in the deep subsurface limit the solubility and enhance the retardation of key radionuclides. A non-technical advantage that the deep borehole concept may offer over a mined geologic repository concept is that of facilitating incremental construction and loading at multiple, perhaps regional, locations.

Such storage would involve positioning of waste canisters at extreme depths of greater than 2,000 m and even to a depth of 5,000 m. Although different materials can be placed in a stratified configuration at such depths, prior configurations did not permit such materials to be secured to the walls of the borehole and, thus, may not adequately secure the waste canisters within the borehole.

Liquids present in such boreholes, such as, drilling fluid and/or naturally contaminated water well below the water table, can create additional challenges. For example, known bridge plugs for downhole drilling are sealed to prevent fluid transport from below the bridge plug to above the bridge plug. Such sealing renders known bridge plugs incapable of being used in conditions where fluid is to travel from below the bridge plugs to above the bridge plugs.

Known camming systems provide the ability to support certain objects. However, known camming systems are capable of being actuated from relatively short distances (such as, within 1 m and/or less than 50 m), involve weight-bearing portions being positioned below the camming system (thus, prohibiting their use to support objects above the camming system), are not available for high-pressure and/or submerged conditions, are not available for supporting heavy weights (such as, greater than 150 kg), or combinations thereof.

A support system, an excavation arrangement, and a process of supporting an object that do not suffer from one or more of the above drawbacks would be desirable in the art.

BRIEF DESCRIPTION OF THE INVENTION

In an exemplary embodiment, a support system includes a weight-bearing device and a camming mechanism positioned below the weight-bearing device. A downward force on the weight-bearing device at least partially secures the camming mechanism to opposing surfaces.

In another exemplary embodiment, an excavation arrangement includes a borehole, a support system positioned within and secured to the borehole, and an object positioned on and supported by the support system. The support system includes a weight-bearing device and a camming mechanism positioned below the weight-bearing device. A downward force on the weight-bearing device at least partially secures the camming mechanism to opposing surfaces of the borehole.

In another exemplary embodiment, a process of supporting an object includes positioning and securing a support system and positioning the object on the weigh-bearing device. The support system including a weight-bearing device and a camming mechanism positioned below the weigh-bearing device. A downward force from the positioning of the object on the weight-bearing device at least partially secures the camming mechanism to opposing surfaces of the borehole.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided is an exemplary support system, an exemplary excavation arrangement, and an exemplary process of supporting an object. Embodiments of the present disclosure permit objects to be positioned in a more secure manner (such as, a subterranean environment), permit and/or secure easier storage of certain materials (for example, nuclear waste), permit walls/surfaces to be engaged based upon actuation from long distances, permit objects to be supported above a camming mechanism in contrast to below a camming mechanism, permit objects (such as, hazardous waste containers) to be positioned at substantial depths of boreholes (for example, greater than about 2,000 m, up to about 5,000 m, and/or at depths below a level where liquids are present), include camming systems capable of being actuated from relatively long distances (such as, greater than about 50 m, greater than about 100 m, greater than about 1,000 m, greater than about 2,000 m, up to about 5,000 m, or at any other suitable distance), include weight-bearing portions being positioned above the camming system (thus, permitting their use to support objects above the camming system), permit use in high-pressure and/or submerged conditions, permit use with heavy weights (such as, greater than 150 kg), or combinations thereof.

Figure 1:
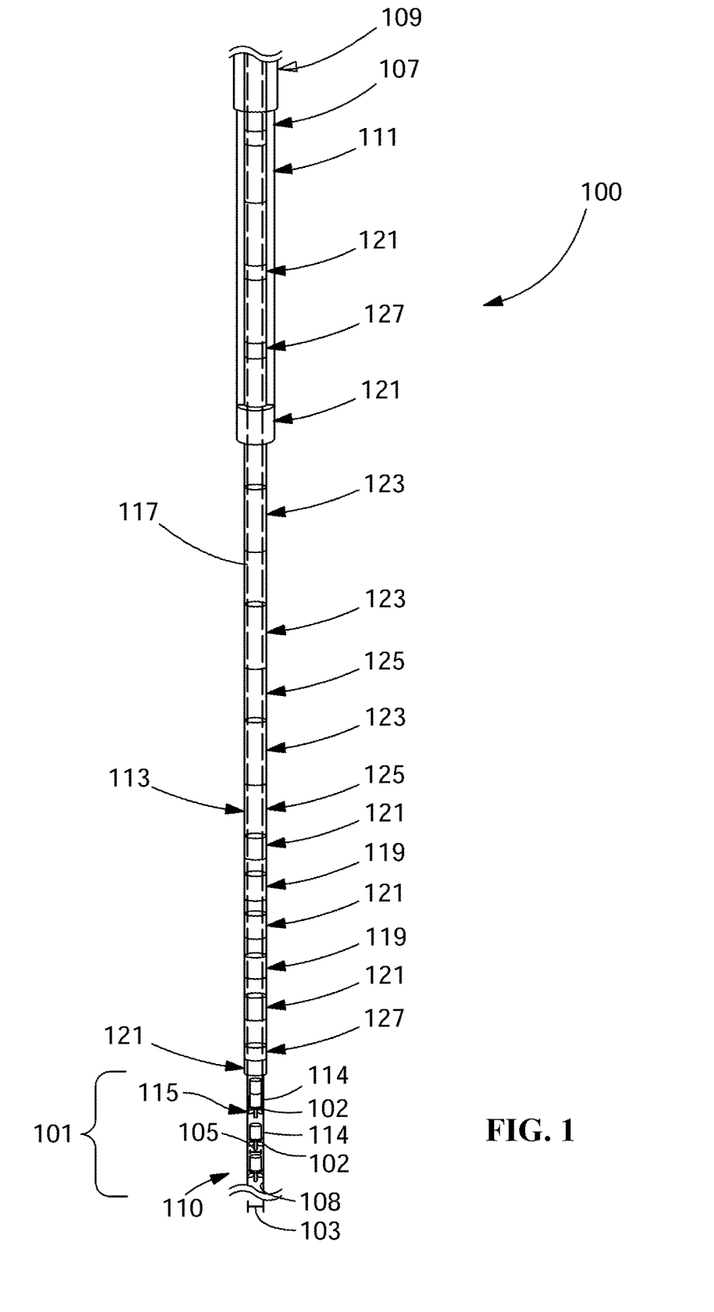
FIG. 1 is a schematic view of an exemplary excavation arrangement according to an embodiment of the disclosure.

FIG. 1 shows an excavation arrangement 100 extending downward, for example, permitting storage of an object 114, such as temporary storage, storage that is intended to be permanent storage, or permanent storage. As used herein, directional terms correspond to down or below reference a direction consistent with the force of gravity or substantially consistent with the force of gravity. For example, a downward force is consistent or substantially consistent with the force of gravity.

Figure 3:
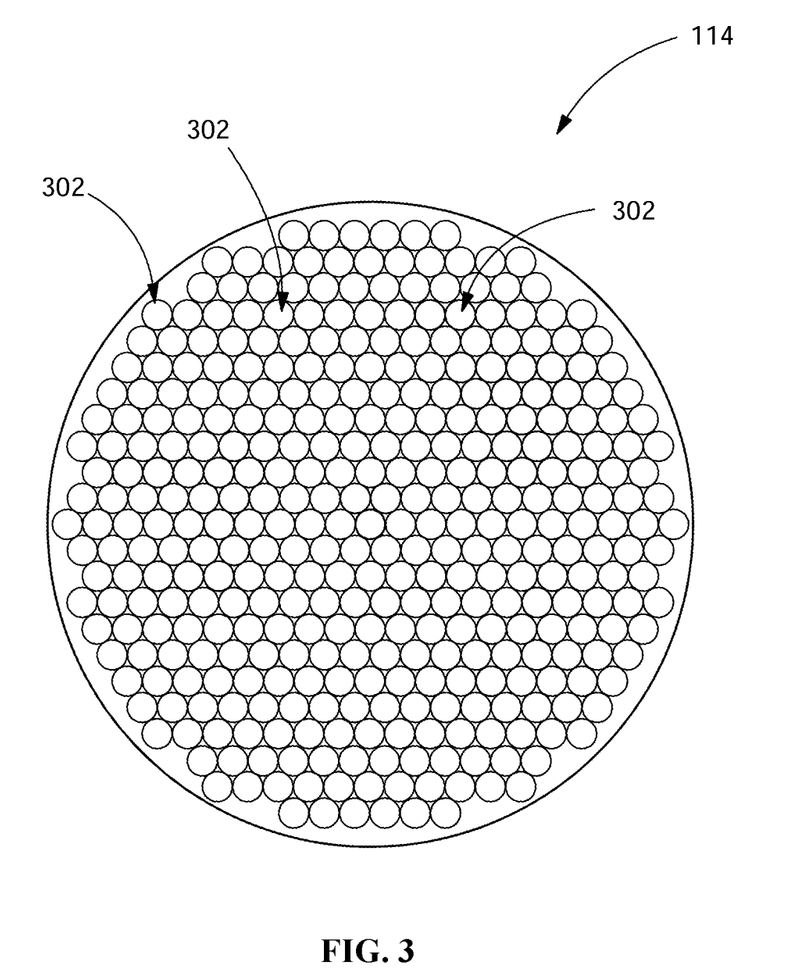
FIG. 3 shows a top view of an object to be supported by the exemplary support system according to an embodiment of the disclosure.

In one embodiment, the object 114 to be stored in the excavation arrangement 100 is a waste drum. For example, as shown in FIG. 3, in one embodiment, the object 114 includes a plurality of elements 302 positioned within the object 114 in a predetermined orientation, for example, about 400 of the elements 302 in the object 114 having a length of about 5 m (for example, the length being in the downward direction upon the object being positioned). In one embodiment, a hexagonal-close-packing of cylindrical nuclear fuel rods permits 367 of the element 302 to be positioned in the object 114 having an inside diameter of 0.21 m and/or 349 of the element 302 in an embodiment where the object 114 has a smaller diameter (for example, the diameter being perpendicular to the length). In a further embodiment, the objects 114 are constructed of carbon steel, sealed by welds, and connected into strings with high-strength connections, for example, of about 200 m length and/or positioned in the lower 2,000 m of an embodiment of the excavation arrangement 100 having one or more casings/liners. Alternatively, the object 114 is positioned in an embodiment of the excavation arrangement 100 that is devoid of any casing and/or liner.

In one embodiment, the separated regions include one or more inert materials, such as, compacted bentonite seals 119, one or more cement plugs 121, cement seals 123, cement-crushed-rock backfill 125, one or more bridge plugs 127 completely sealing between portions above and below the bridge plugs 127, and a support system 102, for example, in a waste emplacement zone or waste storage zone 101, that does not seal portions above and below the support system 102. Additionally or alternatively, asphalt is used in the shallow portion of the excavation arrangement 100.

Figure 2:
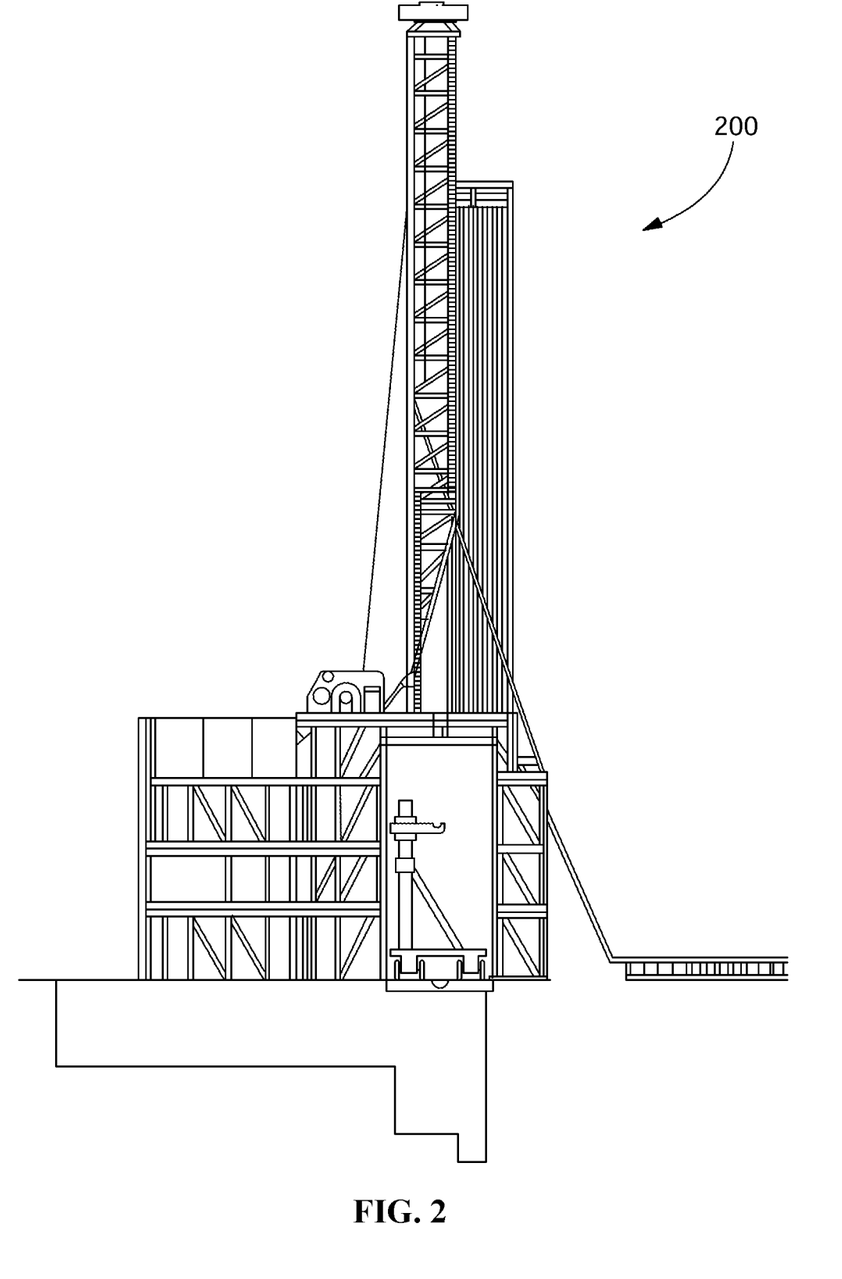
FIG. 2 shows a drilling system for drilling an exemplary excavation arrangement according to an embodiment of the disclosure.

The excavation arrangement 100 includes the support system 102 positioned between opposing surfaces 108, for example, of a borehole 110. The opposing surfaces 108 are portions of a cylinder, arcuate boundaries, planar boundaries, portions of liners and/or casings, geological/natural surfaces, portions of cuboid structures, parallel or substantially parallel surfaces, converging or diverging surfaces, complex-shaped surfaces, any other surfaces having at least a portion that extends on an opposite side of the support system 102, or a combination thereof. In one embodiment, the excavation arrangement 100 is formed by a drilling system 200, as is shown in FIG. 2. As will be appreciated by those skilled in the art, any suitable mechanism may be used for drilling of the excavation arrangement 100 and/or the excavation arrangement 100 may include features based upon natural geological formations, such as, beginning in a crevice, extending into a shaft, beginning in a cave, or any beginning or utilizing any other natural formation or man-made structure.

In one embodiment, the borehole 110 of the excavation arrangement 100 is a portion of an array of the boreholes 110, for example, separated by a predetermined distance, such as, greater than about 50 m, between about 50 m and about 100 m, or any other suitable distance, whether the boreholes 132 are substantially parallel, slightly converging, or slightly diverging. In one embodiment, the boreholes 110 are formed with an average deviation in trajectory of less than a predetermined angle, such as, less than about 0.8 degrees, less than about 0.7 degrees, less than about 0.6 degrees, less than about 0.5 degrees, between about 0.5 degrees and about 0.7 degrees, or any suitable combination, sub-combination, range, or sub-range thereof.

The borehole(s) 110 is/are drilled to any suitable depth. Suitable depths include, but are not limited to, about 7,000 m, about 6,000 m, about 5,000 m, about 4,000 m, between about 4,000 m and about 7,000 m, between about 4,000 m and about 6,000 m, between about 4,000 m and about 5,000 m, between about 5,000 m and about 6,000 m, between about 4,500 m and about 5,500 m, or any suitable combination, sub-combination, range, or sub-range thereof. In one embodiment, the borehole 110 includes the waste storage zone 101 being between certain depths, for example, beyond about 2,000 m, beyond about 3,000 m, beyond about 4,000 m, between about 2,000 m and about 5,000 m, between about 3,000 m and about 5,000 m, between about 3,000 m and about 6,000 m, between about 4,000 m and about 6,000 m, or any suitable combination, sub-combination, range, or sub-range thereof and/or any other suitable depth that is below the water-table by a predetermined amount, such as, 500 m, 1,000 m, or 2,000 m. In one embodiment, the waste storage zone 101 includes crystalline rock.

The borehole 110 includes a lateral dimension 103, such as a diameter in embodiments where the borehole 110 is a cylinder. The lateral dimension 103 corresponds to a dimension slightly greater than the width 105 of the object 114 to be supported by the support system 102, such as the diameter of the object 114 in embodiments where the object 114 is a drum or otherwise cylindrical container. For example, in one embodiment, the lateral dimension 103 of the borehole 110 or a portion of the borehole 110 is slightly larger (for example, about 0.02 m to 0.05 m larger and/or between about 5% and about 10% greater) than the width 105 of the object 114. In one embodiment, the width 105 is about 0.22 m, 0.27 m, 0.30 m, 0.43 m, 0.51 m, or any suitable combination, sub-combination, range, or sub-range thereof.

The excavation arrangement 100 includes any suitable structural features for stability and durability to provide a high level of assurance that the object(s) 114, such as waste canisters, positioned in the borehole 110 is/are positioned at a desired depth without becoming stuck during positioning. In one embodiment, the excavation arrangement 100 includes sufficient stability and durability to allow retrieval of waste canisters during an operational period, if necessary. As used herein, the "operational period" refers to the time until all portions of the excavation arrangement 100 are positioned and surface activity is completed.

An embodiment of the excavation arrangement 100 includes a conductor 107, a surface casing 109, a first intermediate liner 111, a second intermediate liner 113, a guidance liner 115, and a guidance tieback 117 (the outline of which is shown in FIG. 1 for clarity, although the guidance tieback 117 is removed prior to filling of portions above the waste storage region 101), with one or more portions arranged in a telescoping configuration with deeper portions having narrower diameters. For example, in one embodiment of the excavation arrangement 100, the surface casing 109 has a first diameter (such as, about 0.76 m), the first intermediate liner 111 has a second diameter that is smaller than the first diameter (such as, about 0.61 m), the second intermediate liner 113 has a third diameter that is smaller than the second diameter (such as, about 0.47 m), the guidance liner 115 and/or the guidance tieback 117 has/have a fourth diameter that is smaller than the third diameter (such as, about 0.34 m and/or any size larger than the width 105 of the object 114).

In one embodiment, the conductor 107 is a line pipe set to a predetermined depth, for example, between about 15 m and 30 m and/or is cemented in place. The conductor 107 provides a flow conduit and prevents surface rubble from falling in the excavation arrangement 100 while drilling for the surface casing 109. Additionally or alternatively, the surface casing 109 is standard, minimum-property pipe weighing approximately 350 kg/m of pipe and with a tensile yield strength of 390 MPa. These properties permit the surface casing 109 to support its own weight while hanging, and to support an external pressure of 5.32 MPa.

An embodiment of the excavation arrangement 100 includes the first intermediate liner 111 extending into the excavation arrangement 100 to a predetermined depth, such as, about 1500 m and/or is cemented through its entire length. In a further embodiment, the first intermediate liner 111 has a collapse capability of about 8.07 MPa, in comparison to external pressure at 1500 m of about 14.7 MPa, thus requiring the first intermediate liner 111 to include liquid, for example, at or above 690 m below surface. The second intermediate liner 113 extends below the first intermediate liner 111, for example, to a depth of about 3000 m and has similar or the same properties as the first intermediate liner 111. In one embodiment, a lower portion of the second intermediate liner 113, such as, about 160 m from the bottom of the second intermediate liner 113, includes a port collar (not shown), which is a device that can be opened to create a passage from inside of the second intermediate liner 113 to an annulus portion outside of the second intermediate liner 113. In a further embodiment, the second intermediate liner 113 requires liquid to be maintained at a predetermined depth, such as at or above 1530 m.

The guidance liner 115 hangs from the bottom of the second intermediate liner 113 and extends to the bottom of the excavation arrangement 100, for example, to a depth of about 5000 m. In one embodiment, the guidance liner 115 is slotted and/or perforated to allow pressure build-up in the object 114 to dissipate.

The guidance tieback 117 is a casing that extends throughout the excavation arrangement 100, providing a constant or substantially constant diameter path for the object 114 to travel through while being positioned within the excavation arrangement 100 for storage. In one embodiment, upon positioning of the objects 114, the guidance tieback 117 is removed.

Figure 4:
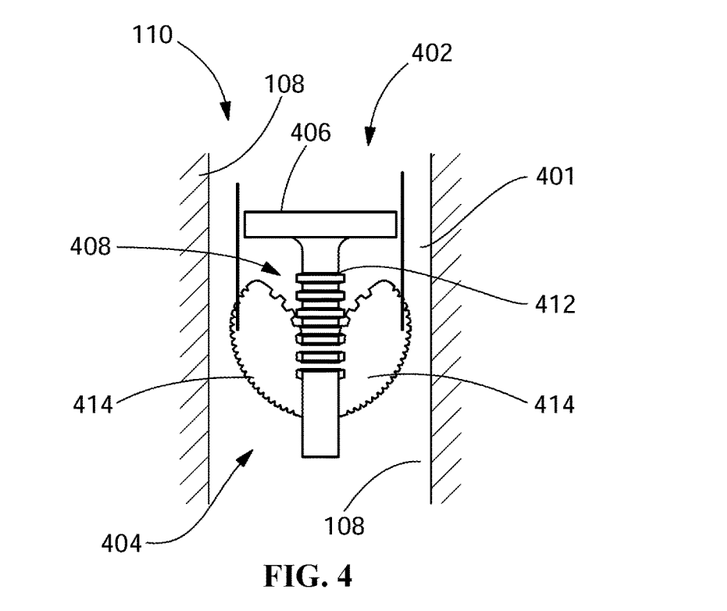
FIG. 4 is a schematic view of an exemplary support system in a disengaged configuration according to an exemplary process of supporting an object according to an embodiment of the disclosure.
Figure 5:
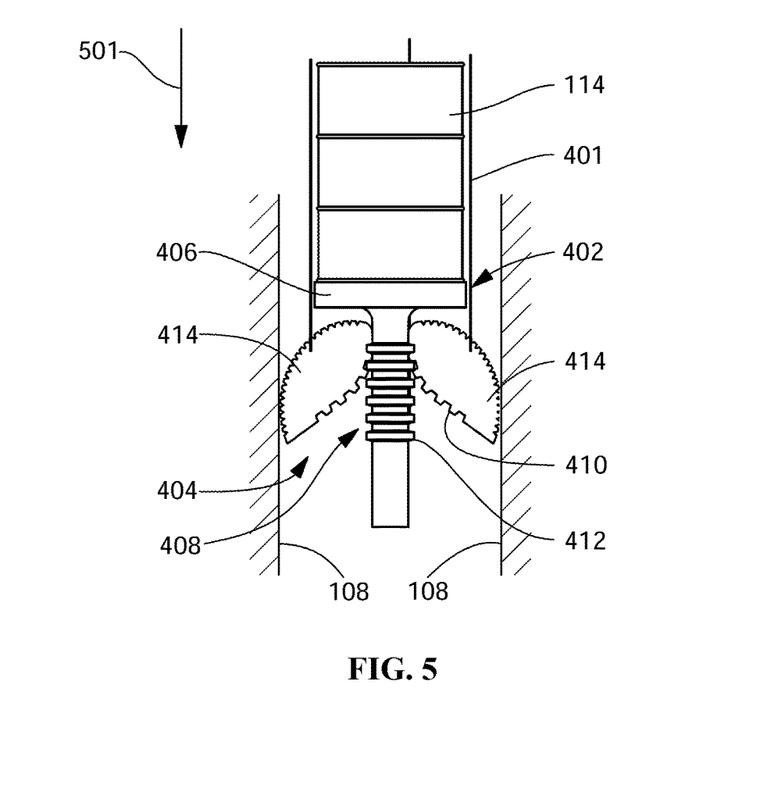
FIG. 5 is a schematic view of an exemplary support system in an engaging configuration according to an exemplary process of supporting an object according to an embodiment of the disclosure.

Referring to FIGS. 4-5, in one embodiment, the support system 102 includes a weight-bearing device 402 and a camming mechanism 404 positioned below the weight-bearing device 402. A downward force 501 on the weight-bearing device 402 at least partially secures the camming mechanism 404 to the opposing surfaces 108, for example, of the borehole 110, upon the support system 102 being positioned, for example, in the waste storage region 101, with the object 114 being positioned on the weight-bearing device 402. The downward force 501 is present with the support system 102 being in the engaging configuration shown in FIG. 5, in comparison to the disengaged configuration shown in FIG. 4.

In one embodiment, the support system 102 is adjusted from the disengaged configuration to the engaging configuration by an actuation feature 401 configured to adjust the camming mechanism 404. In one embodiment, the actuation feature 401 is one or more cables directly or indirectly connected to the camming mechanism 404. In a further embodiment, the one or more cables extend from below at least a portion of the weigh-bearing device 402 to above the weight-bearing device 402, for example, around the weight-bearing device 402 and/or along the opposing surfaces 108. Additionally or alternatively, the actuation feature 401 includes springs (not shown) capable of being activated from outside of the excavation arrangement 100, includes rotating portions (not shown) capable of being activated by the downward force 501, includes triggered portions (not shown) capable of being activated upon reaching a predetermined location, includes environmentally-actuated features (not shown) capable of being activated upon reaching a predetermined temperature and/or pressure (such as, at a certain depth within the excavation arrangement 100), is devoid of ball-type actuation devices as are used in conventional bridge plugs, or a combination thereof.

The weight-bearing device 402 includes any suitable portions, such as, a support portion 406 (for example, a platform or surface including any suitable features, such as, a lip, alignment features, securing features, or other features for receiving the object 114) for receiving and/or supporting the object 114 and an engagement portion 408 for engaging the camming mechanism 404. In one embodiment, the camming mechanism 404 is positioned entirely below the support portion 406. In contrast to a traditional bridge plug, the weight-bearing device 402 is arranged and disposed to permit fluid to travel from below the weight-bearing device 402 to above the weight-bearing device 402 during the operational period, independent of whether in engaging configuration or disengaged configuration.

The engagement portion 408 permits the weight-bearing device 402 to engage the camming mechanism 404. In one embodiment, the engagement portion 408 and/or a corresponding surface of the camming mechanism 404 include(s) a means for engagement, such as, teeth 410, ridges 412, slips, projections, extensions, ridges, spikes, threading, gears, or any other suitable interlocking features. The interlocking features include any suitable structures, including, but not limited to, spiraled threads on one or both of the camming mechanism 404 and the weight-bearing device 402, spring-loaded features (not shown) for urging the camming mechanism 404 into the engaging configuration, widths of the teeth 410 and/or the ridges 412 to permit or prevent repeated movement from the disengaged configuration to the engaging configuration (such as being loose or having a locking/interference fit), release features for releasing the actuation feature 401 upon the camming mechanism 404 being positioned in the engaging configuration, or combinations thereof.

In one embodiment, portions of the camming mechanism 404 arranged and disposed to engage the opposing surfaces include suitable materials for engaging the opposing surface(s) 108 and/or features for engaging the opposing surface(s) 108 (for example, the teeth 410, the slips, the projections, the extensions, the ridges, the spikes, other suitable engaging features). Suitable materials for engaging the opposing surfaces 108 include, but are not limited to, hardened metal, coatings, ceramic coatings, ceramic materials, tungsten carbide, materials having a Mohs value greater than quartz and/or feldspar, or a combination thereof.

Figure 6:
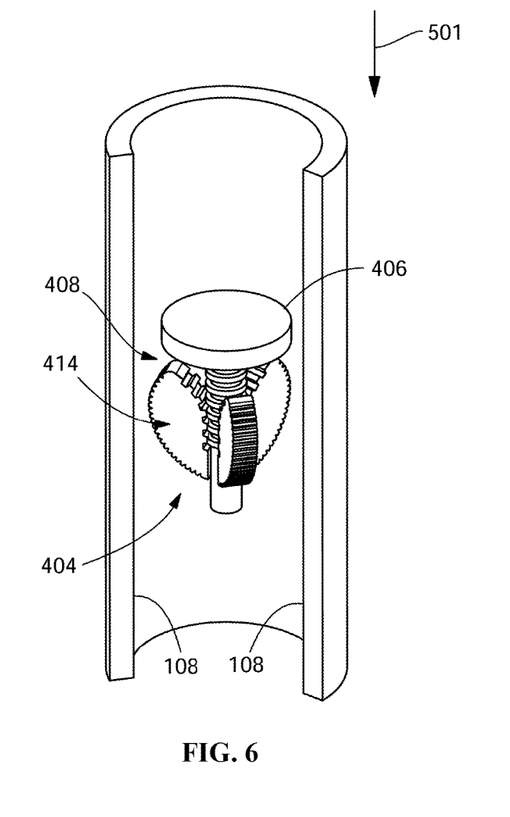
FIG. 6 is a cutaway perspective view of a portion of an exemplary excavation arrangement having an exemplary support system according to an embodiment of the disclosure.
Figure 7:
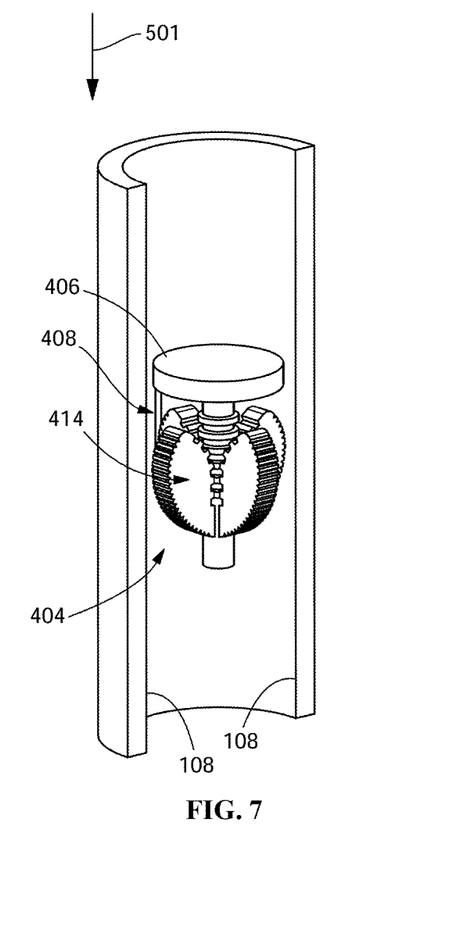
FIG. 7 is a cutaway perspective view of a portion of an exemplary excavation arrangement having an exemplary support system according to an embodiment of the disclosure.
Figure 8:
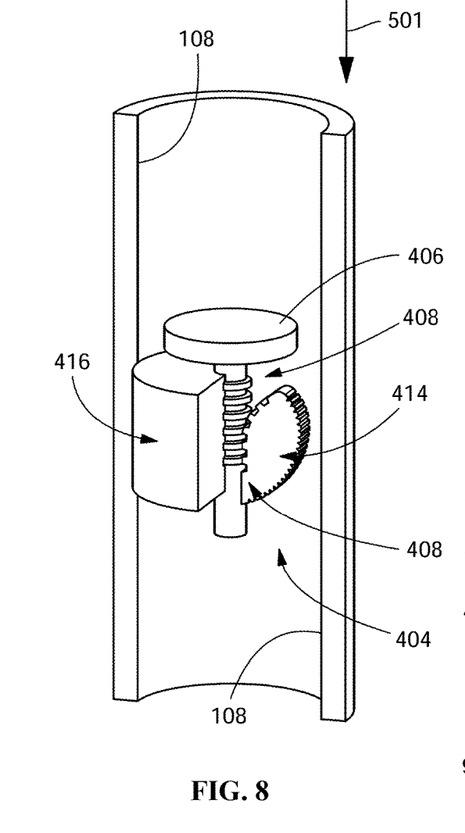
FIG. 8 is a cutaway perspective view of a portion of an exemplary excavation arrangement having an exemplary support system according to an embodiment of the disclosure.

The camming mechanism 404 includes at least one cam 414. As shown in FIGS. 4-5, in one embodiment, the camming mechanism 404 includes or consists of two of the cams 414. In further embodiments, the camming mechanism 404 includes more than two of the cams 414. Referring to FIG. 6, in one embodiment, the camming mechanism 404 includes or consists of three of the cams 414. Referring to FIG. 7, in one embodiment, the camming mechanism 404 includes or consists of four of the cams 414. Referring to FIG. 8, in one embodiment, the camming mechanism 404 consists of the cam 414 and a body 416 arranged and disposed to permit the cam 414 to contact a first surface of the opposing surface 108 while the body 416 contacts a second surface of the opposing surfaces 108. The body 416 includes a geometry configured for contacting the second surface of the opposing surfaces 108, for example, being arcuate, cuboid, asymmetric, complex-shaped, or a combination thereof.

Figure 9:
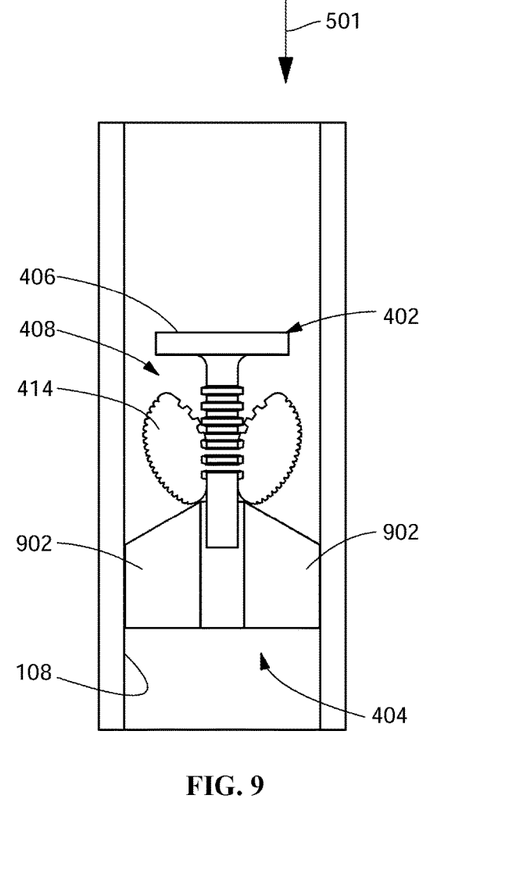
FIG. 9 is a sectioned view of an exemplary excavation arrangement having an exemplary support system according to an embodiment of the disclosure.

In other embodiments, the weight-bearing device 402 and/or the camming mechanism 404 include other features for positioning and securing the support system 102 in response to the downward force 501 of the object 114 and/or adjusting the actuation feature 401. For example, as shown in FIG. 9, in one embodiment, a lower body 902 is positioned below the support system 102 and is arranged and disposed to urge the camming mechanism 404 into the engaged configuration upon the lower body 902 directly or indirectly contacting the camming mechanism 404, thereby causing the cam(s) 414 to contact the opposing surface(s) 108.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A support system, comprising:
weight-bearing device; and
a camming mechanism positioned below the weight-bearing device;
wherein a downward force on the weight-bearing device at least partially secures the camming mechanism to opposing surfaces; and
wherein one or more cables directly or indirectly connected to the camming mechanism are operable to apply a force to the camming mechanism to engage the camming mechanism to the opposing surfaces.

2. The support system of claim 1, wherein the opposing surfaces are a wall of a borehole.

3. The support system of claim 2, wherein the borehole is cylindrical or substantially cylindrical.

4. The support system of claim 1, wherein the opposing surfaces are a portion of an excavation.

5. The support system of claim 1, wherein the opposing surfaces are opposing walls.

6. The support system of claim 1, further comprising an actuation feature arranged and disposed to adjust the camming mechanism from a disengaged configuration to an engaging configuration.

7. The support system of claim 1, wherein the one or more cables extend from below at least a portion of the weight-bearing device to above the weight-bearing device.

8. The support system of claim 1, wherein the weight-bearing device includes a support portion for supporting an object and an engagement portion for engaging the camming mechanism.

9. The support system of claim 8, wherein the camming mechanism is positioned entirely below the support portion.

10. The support system of claim 8, wherein the engagement portion includes a threaded region.

11. The support system of claim 10, wherein the threaded region is spiraled.

12. The support system of claim 10, wherein the threaded region includes ridges.

13. The support system of claim 1, wherein the camming mechanism includes teeth for engaging the weight-bearing device.

14. The support system of claim 1, wherein the camming mechanism includes teeth for engaging the opposing surfaces.

15. The support system of claim 1, wherein the camming mechanism includes a cam and a body, the body arranged and disposed to permit the cam to contact a first surface of the opposing surface while the body contacts a second surface of the opposing surfaces.

16. The support system of claim 1, wherein the camming mechanism includes two or more cams.

17. The support system of claim 1, wherein the weight-bearing device is arranged and disposed to permit fluid flow from below the weight-bearing device to above the weight-bearing device during an operational period.

18. An excavation arrangement, comprising:
a borehole;
a support system positioned within and secured to the borehole; and
an object positioned on and supported by the support system;
wherein the support system includes a weight-bearing device and a camming mechanism positioned below the weight-bearing device;
wherein a downward force on the weight-bearing device at least partially secures the camming mechanism to opposing surfaces of the borehole; and
wherein one or more cables directly or indirectly connected to the camming mechanism apply a force to the camming mechanism to engage the camming mechanism to the borehole.

19. A process of supporting an object within a borehole, the process comprising:
positioning and securing a support system, the support system including a weight-bearing device and a camming mechanism positioned below the weight-bearing device;
operating one or more cables directly or indirectly connected to the camming mechanism by pulling on the one or more cables to engage the camming mechanism to the borehole;
and
positioning the object on the weight-bearing device;
wherein a downward force from the positioning of the object on the weight-bearing device at least partially secures the camming mechanism to opposing surfaces of the borehole.

\* \* \* \* \*